United States Patent
Min et al.

(10) Patent No.: US 10,754,172 B2
(45) Date of Patent: Aug. 25, 2020

(54) LAMP MODULE FOR VEHICLE

(71) Applicants: HYUNDAI MOBIS Co., Ltd., Seoul (KR); Mireco Co., Ltd., Paju-si (KR); Diabell Co., Ltd., Anyang-si (KR)

(72) Inventors: Kyung Gu Min, Yongin-si (KR); Jung Young Kim, Seoul (KR); Sam Jong Kim, Anyang-si (KR); Hyun In Chung, Seoul (KR)

(73) Assignees: Hyundai Mobis Co., Ltd., Seoul (KR); Mireco Co., Ltd., Paju-si (KR); Diabell Co., Ltd., Anyang-si (KR)

( * ) Notice: Subject to any disclaimer, the term of this patent is extended or adjusted under 35 U.S.C. 154(b) by 0 days.

(21) Appl. No.: 16/111,209

(22) Filed: Aug. 24, 2018

(65) Prior Publication Data
US 2019/0064537 A1 Feb. 28, 2019

(30) Foreign Application Priority Data
Aug. 28, 2017 (KR) .................. 10-2017-0108478

(51) Int. Cl.
*G02B 30/27* (2020.01)
*F21S 43/20* (2018.01)
(Continued)

(52) U.S. Cl.
CPC ............ *G02B 30/27* (2020.01); *F21S 41/285* (2018.01); *F21S 43/14* (2018.01); *F21S 43/15* (2018.01); *F21S 43/26* (2018.01)

(58) Field of Classification Search
CPC ...... F21S 41/141; F21S 41/143; F21S 41/153; F21S 41/24; F21S 41/285; F21S 43/26
See application file for complete search history.

(56) References Cited

U.S. PATENT DOCUMENTS

| 9,252,348 B2 | 2/2016 | Oh |
| 9,590,210 B2 | 3/2017 | Kim et al. |

(Continued)

FOREIGN PATENT DOCUMENTS

| JP | 2011-048937 | 3/2011 |
| JP | 2013-219325 | 10/2013 |

(Continued)

OTHER PUBLICATIONS

Korean Office Action dated Jun. 25, 2019, issued in Korean Patent Application No. 10-2017-0108478.
(Continued)

*Primary Examiner* — Leah Simone Macchiarolo
(74) *Attorney, Agent, or Firm* — H.C. Park & Associates, PLC

(57) ABSTRACT

A lamp module for a vehicle is provided. The lamp module for a vehicle includes: a housing defining a space portion therein; a light source assembly accommodated in the housing and including a light source configured to generate light and a substrate coupled to the light source to supply a current; a light diffuser disposed above the light source assembly to diffuse irradiated light; a composite optical sheet disposed above the light diffuser and configured to realize a luminous image having a stereoscopic pattern when diffused light is incident thereon; and bezels formed on an outer circumferential surface of the housing.

15 Claims, 2 Drawing Sheets

(51) Int. Cl.
*F21S 43/14* (2018.01)
*F21S 43/15* (2018.01)
*F21S 41/20* (2018.01)

(56) References Cited

U.S. PATENT DOCUMENTS

| | | | |
|---|---|---|---|
| 9,733,417 B2 | 8/2017 | Jang et al. | |
| 9,869,449 B2* | 1/2018 | Park | F21V 7/00 |
| 10,400,988 B2* | 9/2019 | Kang | F21V 7/04 |
| 2013/0329444 A1* | 12/2013 | Oh | F21V 21/00 |
| | | | 362/543 |
| 2014/0133128 A1* | 5/2014 | Oh | G09F 13/08 |
| | | | 362/84 |
| 2014/0168997 A1* | 6/2014 | Lee | F21V 17/164 |
| | | | 362/311.06 |
| 2014/0333873 A1 | 11/2014 | Hyung et al. | |
| 2015/0043234 A1* | 2/2015 | Kang | F21S 43/14 |
| | | | 362/516 |
| 2015/0085467 A1* | 3/2015 | Tsumori | F21S 43/255 |
| | | | 362/84 |
| 2015/0085512 A1* | 3/2015 | Kim | F21S 43/14 |
| | | | 362/517 |
| 2015/0338048 A1* | 11/2015 | Ahn | F21S 43/239 |
| | | | 362/511 |
| 2015/0338054 A1* | 11/2015 | Kim | F21V 5/04 |
| | | | 362/509 |
| 2015/0346422 A1 | 12/2015 | Jang et al. | |
| 2016/0010811 A1* | 1/2016 | Benitez | F21S 41/43 |
| | | | 362/509 |
| 2016/0349442 A1* | 12/2016 | Berard | B32B 17/10018 |
| 2018/0149325 A1 | 5/2018 | Lee et al. | |

FOREIGN PATENT DOCUMENTS

| | | |
|---|---|---|
| JP | 2017-518615 | 7/2017 |
| KR | 10-2014-0132913 | 11/2014 |
| KR | 10-2015-0043862 | 4/2015 |
| KR | 10-2016-0139831 | 12/2016 |
| KR | 10-2016-0140249 | 12/2016 |
| WO | 2007/013313 | 2/2007 |

OTHER PUBLICATIONS

Office Action dated Jul. 23, 2019, issued in Japanese Patent Application No. 2018-157209.

\* cited by examiner

LAMP MODULE FOR VEHICLE

CROSS-REFERENCES TO RELATED APPLICATION

This application claims priority from and the benefit of Korean Patent Application No. 10-2017-0108478, filed on Aug. 28, 2017, which is hereby incorporated by reference for all purposes as if set forth herein.

BACKGROUND

Field

Exemplary embodiments relate to a lamp module for a vehicle, and more particularly, to a lamp module for a vehicle which is capable of implementing a three-dimensional image when a lamp is turned on, and thus, provides excellent depth perception, excellent sense of transformation, and excellent reliability.

Discussion of the Background

A lamp for a vehicle is a lamp that irradiates light forward to allow the vehicle to be safely driven. The lamp module for a vehicle includes a head lamp module and a rear lamp module. The head lamp module includes a reflector configured to collect light emitted from a light source and irradiate the collected light forward, and a bezel configured to accommodate the reflector. As a design of such a head lamp receives attention as a factor determining design characteristics of the vehicle, a design of the head lamp gradually becomes complicated and diversified.

Recently, in order to satisfy visibility and aesthetics of a user, there has been a need for a lamp module for a vehicle providing excellent depth perception.

On the other hand, three-dimensional (3D) lens sheets have an effect in that a plurality of lenses are formed to mutually constitute patterns and thus are viewed as a small embossed surface. This uses a refraction effect of each lens.

A lenticular lens of the 3D lens sheets is manufactured using a transparent resin and is formed by arranging a plurality of semicircular unit lenses. Since the lenticular lens allows a two-dimensional planar image to be three-dimensionally identified by using binocular parallax, and allows images at different viewpoints to be viewed according to a viewing position, the lenticular lens provides excellent depth perception and an excellent sense of transformation.

However, in the 3D lens sheet, product management is difficult due to the patterns formed by the plurality of lenses formed on a surface of the 3D lens sheet. That is, foreign substances are caught between the patterns and are difficult to remove, thereby gradually reducing original transparency of the lens sheet and decreasing a lifespan of a product.

The above information disclosed in this Background section is only for enhancement of understanding of the background of the invention and, therefore, it may contain information that does not constitute prior art.

SUMMARY

Exemplary embodiments of the present invention provide a lamp module of a vehicle. In one embodiment, a lamp module for a vehicle includes: a housing defining a space portion therein; a light source assembly accommodated in the housing and including a light source configured to generate light and a substrate coupled to the light source to supply a current; a light diffuser disposed above the light source assembly to diffuse irradiated light; a composite optical sheet disposed above the light diffuser and configured to realize a luminous image having a three dimensional pattern when diffused light is incident thereon; and bezels formed on an outer circumferential surface of the housing, wherein the composite optical sheet includes a composite optical layer disposed above the light diffuser and having a first optical pattern layer which have a lenticular pattern and a second optical pattern layer which has a concave pattern with a pitch equal to that of the first optical pattern layer and is formed on the first optical pattern layer.

The light diffuser may include at least one of a corrosion lens, a milky lens, and a light diffusion film, which diffuse light incident from the light source assembly.

The composite optical sheet may be spaced apart from the light diffuser.

The light source may include at least one of a light emitting diode (LED) and an organic light emitting diode (OLED).

The composite optical sheet may further include a base layer formed below the first optical pattern layer of the composite optical layer, and a printed pattern layer formed below the base layer, wherein the printed pattern layer has a resin matrix and an ink pattern formed on the resin matrix.

The base layer may include at least one selected from a polymethyl methacrylate resin, a polyester-based resin, a polycarbonate resin, and a cyclic olefin copolymer resin.

The resin matrix may include a transparent resin, and the ink pattern is formed using a transparent ink composition.

A reinforcing printed pattern may be further formed on a lower surface of the printed pattern layer.

A protective film layer may be further formed on an upper surface of the second optical pattern layer.

The first optical pattern layer and the second optical pattern layer may be in contact with each other.

A first primer layer may be further formed between the first optical pattern layer and the second optical pattern layer.

The lamp module may further include at least one of a second primer layer formed between the first optical pattern layer and a base layer, and a third primer layer formed between the base layer and a printed pattern layer.

After the lamp module is left for 240 hours in conditions of a temperature of 50±2° C. and a relative humidity (RH) of 95±2%, when the lamp module is visually observed, bubbles, surface peeling, discoloration, and deformation may not occur, and after the lamp module is left for 300 hours in a condition of a temperature of 110±2° C., when the lamp module is visually observed, bubbles, surface peeling, discoloration, and deformation may not occur.

The lamp module may be a rear lamp module or a head lamp module.

Since the lamp module for a vehicle of the present invention includes a composite optical sheet including a lenticular pattern and a concave pattern, excellent depth perception and sense of transformation depending on the viewing angle may be realized at the same time. Accordingly, the lamp module for a vehicle may have excellent visibility, excellent durability, and excellent reliability.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

DETAILED DESCRIPTION OF THE ILLUSTRATED EMBODIMENTS

Figure 1:
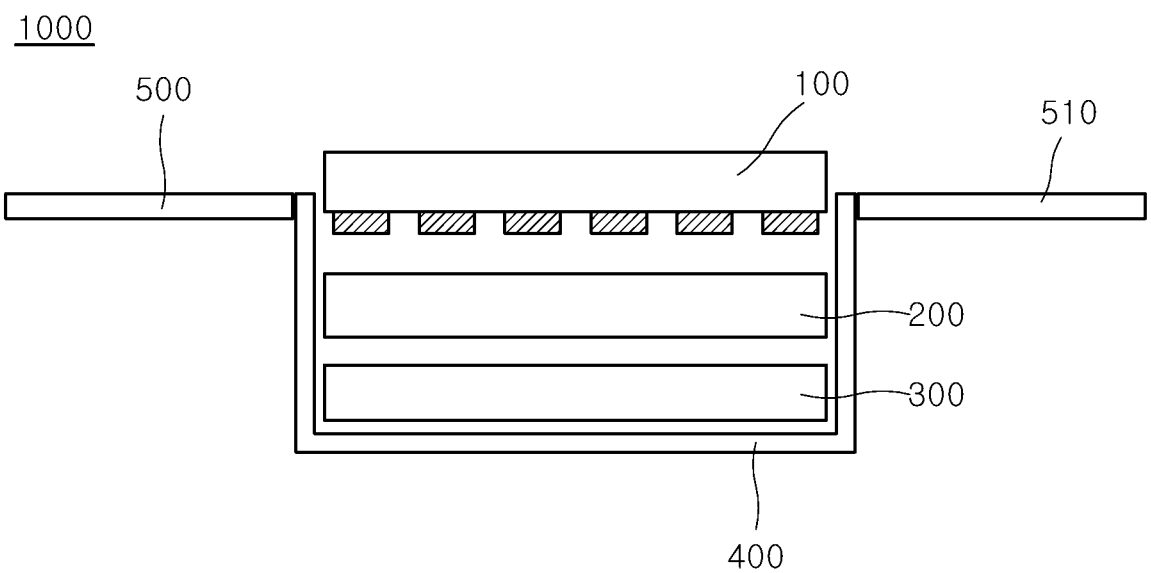
- FIG. 1 illustrates a lamp module for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It should be noted that all of the drawings are described from the viewpoint of the observer. It will be understood that, when an element is referred to as being "on" another element, the element can be directly formed on the other element, or intervening element(s) may also be present therebetween. In addition, it should be understood that the present invention may be embodied in different ways by those skilled in the art without departing from the scope of the present invention. Like components will be denoted by like reference numerals throughout the drawings.

Lamp Module for Vehicle

An aspect of the present invention relates to a lamp module for a vehicle. FIG. 1 illustrates a lamp module 1000 for a vehicle in accordance with an embodiment of the present invention. Referring to FIG. 1, the lamp module 1000 for a vehicle includes a housing 400 defining a space portion therein; a light source assembly 300 accommodated in the housing 400 and including a light source configured to generate light and a substrate coupled to the light source to supply a current; a light diffuser 200 disposed above the light source assembly 300 to diffuse irradiated light; a composite optical sheet 100 disposed above the light diffuser 200 and configured to realize a luminous image having a three dimensional pattern when diffused light is incident thereon; and bezels 500 and 510 formed on an outer circumferential surface of the housing 400.

In an embodiment, the light source of the light source assembly 300 may include at least one of a light emitting diode (LED) and an organic light emitting diode (OLED). The substrate controls supply of a current to the light source. For example, the substrate may be a printed circuit board (PCB) substrate, but is not limited thereto.

In an embodiment, the light diffuser 200 may include at least one light diffusion means of a corrosion lens, a milky lens, and a light diffusion film, which diffuse light incident from the light source assembly 300.

In an embodiment, the corrosion lens functions to diffuse light incident from the light source assembly 300 so as to obtain uniform luminous intensity. For example, in an embodiment, the corrosion lens may be manufactured by etching (polishing) at least a portion of a surface of a lens, but the present invention is not limited thereto. In an embodiment, the corrosion lens may be made of at least one selected from a polymethyl methacrylate resin, a polyester-based resin, a polycarbonate resin, and a cyclic olefin copolymer resin, but the present invention is not limited thereto.

In an embodiment, the light diffusion film may include a light diffusion component. For example, the light diffusion component may include at least one selected from (meth) acrylic particles, siloxane particles, styrene particles, calcium carbonate, barium sulfate, titanium dioxide, aluminum hydroxide, silica, glass, talc, mica, white carbon, magnesium oxide, and zinc oxide.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Referring to FIG. 1, the light source assembly 300 and the light diffuser 200 may be spaced apart from each other by a certain distance. In addition, the composite optical sheet 100 may be spaced apart from the light diffuser 200 by a certain distance. In such a condition, light passing through the light diffuser 200 may be easily diffused.

Figure 2:
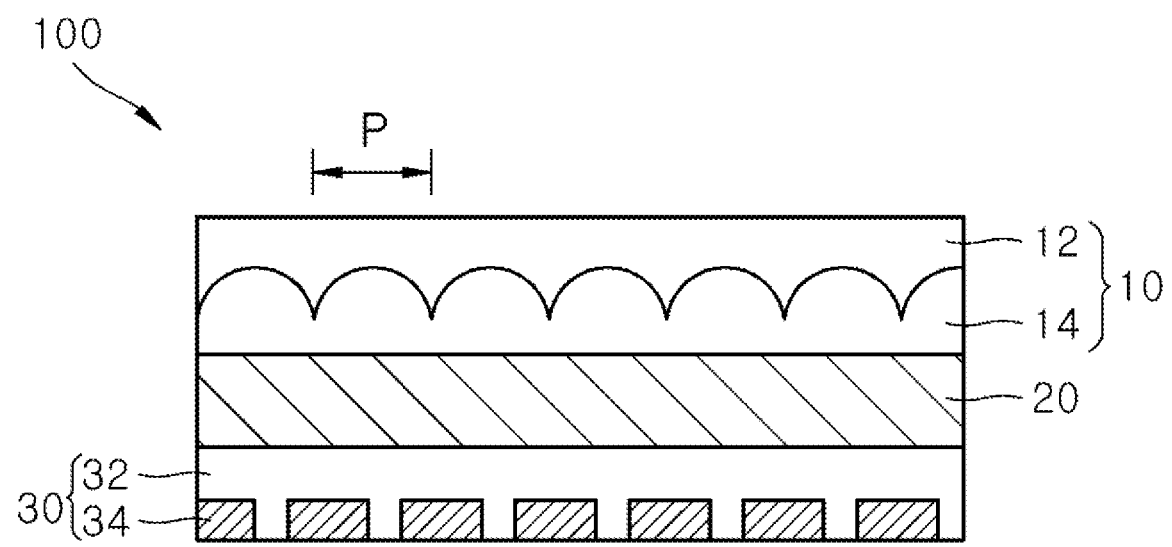
FIG. 2 illustrates a composite optical sheet of a lamp module for a vehicle, in accordance with an embodiment of the present invention.

FIG. 2 illustrates the composite optical sheet 100 in accordance with an embodiment of the present invention. Referring to FIG. 2, the composite optical sheet 100 includes a composite optical layer 10 disposed above the light diffuser 200. The composite optical layer 10 includes a first optical pattern layer 14 which have a lenticular pattern; and a second optical pattern layer 12 which has a concave pattern with a pitch P equal to that of the first optical pattern layer 14 and is formed on the first optical pattern layer 14.

In an embodiment, the pitch P of each of optical patterns formed on the first optical pattern layer 14 and the second optical pattern layer 12 may be in a range of 5 μm to 100 μm. For example, the pitch P may be in a range of about 10 μm to about 50 μm. Uniform emission efficiency may be secured with respect to an entire surface of the composite optical sheet 100 in the above-described range. For example, the pitch P of each of the optical patterns formed on the first optical pattern layer 14 and the second optical pattern layer 12 may be about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 µm, about 66 µm, about 67 µm, about 68 µm, about 69 µm, about 70 µm, about 71 µm, about 72 µm, about 73 µm, about 74 µm, about 75 µm, about 76 µm, about 77 µm, about 78 µm, about 79 µm, about 80 µm, about 81 µm, about 82 µm, about 83 µm, about 84 µm, about 85 µm, about 86 µm, about 87 µm, about 88 µm, about 89 µm, about 90 µm, about 91 µm, about 92 µm, about 93 µm, about 94 µm, about 95 µm, about 96 µm, about 97 µm about 98 µm about 99 µm or about 100 µm.

When the above-described composite optical layer 10 is applied, a light refraction direction may be adjusted by using a difference between light speed in which light passes through the first optical pattern layer 14 and light speed in which light passes through the second optical pattern layer 12, so that the present invention may concurrently realize excellent depth perception and sense of transformation according to a viewing angle.

For example, the first optical pattern layer 14 may have a lenticular pattern formed by continuously arranging a semi-cylindrical lens, and the second optical pattern layer 12 may have a concave pattern with a pitch equal to that of the lenticular pattern.

Referring to FIG. 2, the composite optical sheet 100 may further include a base layer 20 formed below the first optical pattern layer 14 of the composite optical layer 10; and a printed pattern layer 30 formed below the base layer 20. The printed pattern layer 30 may includes a resin matrix 32 and an ink pattern 34 formed on the resin matrix 32.

The base layer 20 may be provided to form a focal distance of the composite optical layer 10. In an embodiment, the base layer 20 may include at least one selected from a polymethyl methacrylate resin, a polyester-based resin, a polycarbonate resin, and a cyclic olefin copolymer resin.

The printed pattern layer 30 may be printed with a certain image representing a stereoscopic effect. For example, in the printed pattern layer 30, a plurality of images may be inserted in a distance corresponding to one pitch P of the first optical pattern layer 14 and the second optical pattern layer 12. Different images may be realized according to a viewing angle in the condition, and thus, depth perception and a sense of transformation based on viewing angle may be excellent.

In an embodiment, the resin matrix 32 of the printed pattern layer 30 may include a transparent resin, and the ink pattern 34 may be formed using a transparent ink composition. For example, the translucent ink composition may include a solventless composition, a solvent-based composition, or an aqueous composition. In addition, the transparent ink composition may include at least one color material of a red color and a black color.

The resin matrix 32 may be made of at least one selected from a polymethyl methacrylate resin, a polystyrene resin, a polyester-based resin, and a polycarbonate resin, but the present invention is not limited thereto.

In an embodiment, the printed pattern layer 30 may be formed by printing the ink pattern 34 on the resin matrix 32 including the transparent resin by using a transparent ink through a printing process such as gravure printing, relief printing, offset printing, or silk printing.

Referring to FIG. 2, the first optical pattern layer 14 and the second optical pattern layer 12 may be in contact each other. In such a condition, an interface between the first optical pattern layer 14 and the second optical pattern layer 12 may be prevented from being contaminated by foreign substances, thereby preventing degradation of optical performance.

Figure 3:
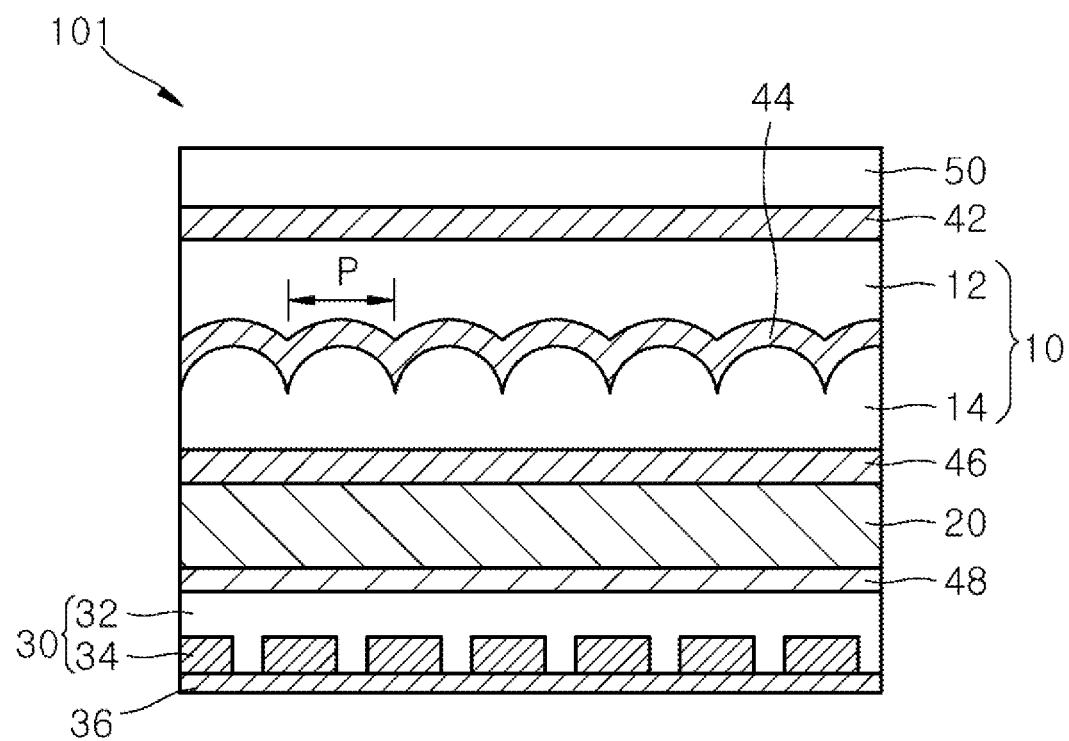
FIG. 3 illustrates a composite optical sheet of a lamp module for a vehicle, in accordance with another embodiment of the present invention.

FIG. 3 illustrates a composite optical sheet 101 in accordance with another embodiment of the present invention. Referring to FIG. 3, the composite optical sheet 101 may further include a first primer layer 44 formed between a first optical pattern layer 14 and a second optical pattern layer 12. In such a condition, when the first primer layer 44 is formed, a composite optical layer 10 may have more excellent durability and more excellent reliability, and an interface between the first optical pattern layer 14 and the second optical pattern layer 12 may be prevented from being contaminated by foreign substances, thereby preventing degradation of optical performance.

In an embodiment, the composite optical sheet 101 may further include at least one of a second primer layer 46 formed between the first optical pattern layer 14 of the composite optical layer 10 and a base layer 20; and a third primer layer 48 formed between the base layer 20 and a printed pattern layer 30. When the second and third primer layers 46 and 48 are formed, the composite optical sheet 101 may have more excellent durability and more excellent reliability.

In an embodiment, a protective film layer 50 may be further formed above the second optical pattern layer 12 of the composite optical layer 10. The protective film layer 50 may be made of at least one selected from a polymethyl methacrylate resin, a polystyrene resin, an acetylcellulose-based resin, a polyester-based resin, and a polycarbonate resin, but the present invention is not limited thereto. For example, the polyester-based resin may be used. The polyester-based resin may include at least one selected from polyethylene terephthalate and polyethylene naphthalate.

In addition, referring to FIG. 3, a fourth primer layer 42 may be further formed between the second optical pattern layer 12 of the composite optical layer 10 and the protective film layer 50.

In an embodiment, the first primer layer 44, the second primer layer 46, the third primer layer 48, and the fourth primer layer 42 may include a primer resin. The primer resin may include at least one selected from a photocurable resin and a thermosetting resin. For example, the primer resin may include a UV-curable resin. For example, the primer resin may include at least one selected from a silicon-based resin, a urethane-based resin, an acrylic-based resin, a polyvinyl alcohol resin, and a polyester-based resin.

In an embodiment, the first primer layer 44, the second primer layer 46, the third primer layer 48, and the fourth primer layer 42 may each have a thickness of about 1 µm to about 50 µm. When a composite optical sheet is formed in such a condition, the composite optical sheet may have more excellent durability and more excellent reliability due to excellent adhesive properties.

In an embodiment, after moisture resistance evaluation in a state in which the lamp module 1000 for a vehicle is left for 240 hours in conditions of a temperature of 50±2° C. and a relative humidity (RH) of 95±2%, when the lamp module 1000 for a vehicle is visually observed, bubbles, surface peeling, discoloration, and deformation may not occur. After heat resistance evaluation in a state in which the lamp module 1000 for a vehicle is left for 300 hours in a condition of a temperature of 110±2° C., when the lamp module 1000 for a vehicle is visually observed, bubbles, surface peeling, discoloration, and deformation may not occur.

For example, after the moisture resistance and heat resistance evaluations are performed on the housing, the light source assembly, the light diffuser, the composite optical sheet, the bezels, and the first to fourth primer layers of the lamp module for a vehicle, bubbles, surface peeling, discoloration, and deformation may not occur.

For example, after the moisture resistance and heat resistance evaluations, bubbles, surface peeling, discoloration, and deformation may not occur in the housing, the light source assembly, the light diffuser, the composite optical sheet, the bezels, and the first to fourth primer layers of the lamp module for a vehicle.

In an embodiment, a reinforcing printed layer 36 may be further formed on a lower surface of the printed pattern layer 30. The reinforcing printed layer 36 may be formed to protect a lower surface of the composite optical sheet 101.

In an embodiment, the lamp module for a vehicle may be a head lamp module or a rear lamp module.

Since the lamp module for a vehicle of the present invention includes a composite optical sheet having a lenticular pattern and a concave pattern, excellent depth perception and sense of transformation may be realized at the same time. Thus, the lamp module for a vehicle may have excellent visibility, excellent durability, and excellent reliability, so that the lamp module for a vehicle may be suitable for use as a rear lamp module for a vehicle.

Hereinafter, the configuration and operation of the present invention will be described in more detail with reference to exemplary embodiments of the present invention. It should be understood that the following examples are provided for illustration only and are not to be construed in any way as limiting the present invention.

Example and Comparative Example

The lamp module 1000 for vehicle as shown in FIG. 1 was prepared, the lamp module 1000 including the housing 400 defining the space portion therein; the light source assembly 300 accommodated in the housing 400 and including a light source configured to generate light and a substrate coupled to the light source to supply a current; the light diffuser 200 including a corrosion lens configured to diffuse light incident from the light source assembly 300 and spaced apart from an upper portion of the light source assembly 300 to diffuse irradiated light; the composite optical sheet 100 spaced from an upper portion of the light diffuser 200 and configured to realize a luminous image having a three dimensional pattern when diffused light is incident thereon; and the bezels 500 and 510 formed on the outer circumferential surface of the housing 400.

As shown in FIG. 3, the composite optical sheet 101 was prepared, the composite optical sheet 101 including the composite optical layer 10 spaced apart from the upper portion of the light diffuser 200 and including the first optical pattern layer 14 which has the lenticular pattern formed by continuously arranging the semi-cylindrical lens and the second optical pattern layer 12 which has a concave pattern with a pitch equal to that of the first optical pattern layer 14 and is formed on the first optical pattern layer 14; the protective film layer 50 formed above the second optical pattern layer 12; the base layer 20 formed below the composite optical layer 10 and made of a polycarbonate resin; the printed pattern layer 30 formed below the base layer 20 and including a transparent resin matrix 32 and the ink pattern 34 formed on the transparent resin matrix 32 and made using a transparent ink composition; the reinforcing printed layer 36 formed on a lower surface of the printed pattern layer 30, wherein the second primer layer 46 is formed between the first optical pattern layer 14 of the composite optical layer 10 and the base layer 20, the third primer layer 48 is formed between the base layer 20 and the printed pattern layer 30, and the fourth primer layer 42 is formed between the second optical pattern layer 12 of the composite optical layer 10 and the protective film layer 50. The first, second, third, and fourth primer layers were formed using an acrylic-based resin.

After moisture resistance evaluation in a state in which the lamp module 1000 for a vehicle was left for 240 hours in conditions of a temperature of 50±2° C. and a relative humidity (RH) of 95±2%, and after heat resistance evaluation in a state in which the lamp module 1000 for a vehicle was left for 300 hours in a condition of a temperature of 110±° C., bubbles, surface peeling, discoloration, and deformation such a warpage were visually observed in the lamp module 1000 for a vehicle.

As a result, it could be seen that bubbles, surface peeling, discoloration, and deformation such as a warpage did not occur in the housing, the light source assembly, the light diffuser, the composite optical sheet, the bezels, and the first to fourth primer layers of the lamp module 1000 for a vehicle.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lamp module for a vehicle, comprising:
a housing defining a space portion therein;
a light source assembly disposed in the housing and comprising a light source configured to generate light and a substrate coupled to the light source to supply a current;
a light diffuser disposed above the light source assembly to diffuse irradiated light;
a composite optical sheet disposed above the light diffuser and configured to realize a luminous image having a three dimensional pattern when diffused light is incident thereon; and
bezels disposed on an outer circumferential surface of the housing,
wherein the composite optical sheet comprises a composite optical layer disposed above the light diffuser and comprising:
a first optical pattern layer which has a lenticular pattern, and
and a second optical pattern layer contacting the first optical pattern layer and which has a concave pattern with a pitch equal to that of the first optical pattern layer,
wherein the concave pattern is disposed on the lenticular pattern.

2. The lamp module of claim 1, wherein the light diffuser comprises at least one of a corrosion lens, a milky lens, and a light diffusion film, which diffuses light incident from the light source assembly.

3. The lamp module of claim 1, wherein the composite optical sheet is spaced apart from the light diffuser.

4. The lamp module of claim 1, wherein the light source comprises at least one of a light emitting diode (LED) and an organic light emitting diode (OLED).

5. The lamp module of claim 1,
wherein the composite optical sheet further comprises a base layer disposed below the first optical pattern layer of the composite optical layer, and a printed pattern layer disposed below the base layer, and wherein the printed pattern layer has a resin matrix and an ink pattern disposed on the resin matrix.

6. The lamp module of claim 5, wherein the base layer comprises at least one material selected from the group consisting of polymethyl methacrylate resin, polyester-based resin, polycarbonate resin, and cyclic olefin copolymer resin.

7. The lamp module of claim 5, wherein the resin matrix comprises a transparent resin, and the ink pattern is formed using a transparent ink composition.

8. The lamp module of claim 5, wherein a reinforcing printed pattern is further formed on a lower surface of the printed pattern layer.

9. The lamp module of claim 5, wherein a first primer layer is further disposed between the first optical pattern layer and the second optical pattern layer.

10. The lamp module of claim 1, wherein a protective film layer is further disposed on an upper surface of the second optical pattern layer.

11. The lamp module of claim 1, wherein the first optical pattern layer and the second optical pattern layer are in direct contact with each other.

12. The lamp module of claim 1, further comprising at least one of a second primer layer disposed between the first optical pattern layer and a base layer, and a third primer layer disposed between the base layer and a printed pattern layer.

13. The lamp module of claim 1, wherein the lamp module is configured such that, after the lamp module is left for 240 hours in conditions of a temperature of $50\pm2°$ C. and a relative humidity (RH) of $95\pm2\%$, when the lamp module is visually observed, bubbles, surface peeling, discoloration, and deformation do not occur, and after the lamp module is left for 300 hours in a condition of a temperature of $110\pm2°$ C., when the lamp module is visually observed, bubbles, surface peeling, discoloration, and deformation do not occur.

14. The lamp module of claim 1, wherein the lamp module is a rear lamp module.

15. The lamp module of claim 1, wherein the lamp module is a head lamp module.

* * * * *